(12) United States Patent
Searfoss

(10) Patent No.: US 6,783,168 B2
(45) Date of Patent: Aug. 31, 2004

(54) SIDE-TO-SIDE TRUCK COVER SYSTEM

(76) Inventor: Timothy K. Searfoss, 1282 E. M-55, West Branch, MI (US) 48661

( * ) Notice: Subject to any disclaimer, the term of this patent is extended or adjusted under 35 U.S.C. 154(b) by 84 days.

(21) Appl. No.: 09/957,202

(22) Filed: Sep. 20, 2001

(65) Prior Publication Data

US 2003/0052505 A1 Mar. 20, 2003

(51) Int. Cl.⁷ .................................................. B60P 7/02
(52) U.S. Cl. ................ 296/98; 296/100.11; 296/100.14
(58) Field of Search .............................. 296/98, 100.14, 296/100.01, 100.11–100.18; 160/23.1, 50–52, 265, 370.22

(56) References Cited

U.S. PATENT DOCUMENTS

| | | | | |
|---|---|---|---|---|
| 3,168,345 A | * | 2/1965 | Roberts et al. | 296/100.14 |
| 3,416,834 A | * | 12/1968 | Morse, Jr. | 296/100.14 |
| 4,129,331 A | * | 12/1978 | Lawson et al. | 296/100.14 |
| 4,265,479 A | * | 5/1981 | Langston | 296/100.14 |
| 4,659,134 A | * | 4/1987 | Johnson | 296/98 |
| 4,673,208 A | * | 6/1987 | Tsukamoto | 296/98 |
| 5,031,955 A | | 7/1991 | Searfoss | |
| 5,328,228 A | | 7/1994 | Klassen | |
| 5,487,584 A | * | 1/1996 | Jespersen | 296/98 |
| 5,829,819 A | | 11/1998 | Searfoss | |
| 5,887,937 A | | 3/1999 | Searfoss | |
| 5,924,758 A | | 7/1999 | Dimmer et al. | |
| 5,944,374 A | | 8/1999 | Searfoss | |
| 6,135,534 A | * | 10/2000 | Schmeichel | 296/98 |
| 6,152,516 A | * | 11/2000 | Williams | 296/98 |
| 6,206,449 B1 | | 3/2001 | Searfoss | |
| 6,338,521 B1 | * | 1/2002 | Henning | 296/100.15 |

* cited by examiner

Primary Examiner—D. Glenn Dayoan
Assistant Examiner—Greg Blankenship
(74) Attorney, Agent, or Firm—Cardinal Law Group

(57) ABSTRACT

An arm assembly for a cover of a truck includes a base, an intermediate segment, and an extension. The base is pivotably connected to the truck proximate a top of a cab of the truck. The intermediate segment is pivotably connected to the base, and the extension is connected to the cover and pivotably connected to the intermediate segment.

10 Claims, 3 Drawing Sheets

SIDE-TO-SIDE TRUCK COVER SYSTEM

TECHNICAL FIELD

This invention relates to covers for truck beds, and more particularly to a side-to-side truck cover system.

BACKGROUND ART

Many trucks, particularly those hauling loose loads such as sand and gravel, need a truck cover to prevent the wind from blowing load particles off the load bed. Various apparatus have been devised for covering a truck load. Some such apparatus include a motor for selectively winding a flexible cover. An effective truck cover should be one which is easily operated by the truck driver so as to selectively cover and uncover the truck bed from the convenient location of the truck cab. My U.S. Pat. No. 5,031,955, the disclosure of which is hereby incorporated by reference, provides a truck cover which may be conveniently motor operated from the cab of a truck to extend the cover from a winding assembly proximate the front of the truck bed and forward the rear of the truck bed.

A need also exists for systems that cover the truck bed from side to side. For instance, U.S. Pat. No. 5,328,228 shows a cover for truck bed and cargo. Similarly, U.S. Pat. No. 5,924,758 shows a roll assist mechanism for tarp systems. My U.S. Pat. No. 6,206,449, the disclosure of which is also hereby incorporated by reference, shows a side-to-side truck cover system including a pair of arms, each of which includes a base and an extension.

DISCLOSURE OF INVENTION

The present invention is an arm assembly for a cover of a truck. The arm assembly comprises a base, an intermediate segment, and an extension. The base is pivotably connected proximate a top of a cab of the truck, and the intermediate segment is pivotably connected to the base. The extension is connected to the cover and pivotably connected to the intermediate segment.

Accordingly, an object of this invention is to provide an assembly of the type described above which covers the bed of a truck from side to side.

Another object of this invention is to provide an assembly of the type described above which provides selective, powered control over covering and uncovering the load bed.

Still another object of this invention is to provide an assembly of the type described above which can be mounted proximate the top of the truck cab.

These and other objects, features, and advantages of the present invention are readily apparent from the following detailed description of the best mode for carrying out the invention when taken in conjunction with the accompanying drawings.

BEST MODE FOR CARRYING OUT THE INVENTION

Figure 1:
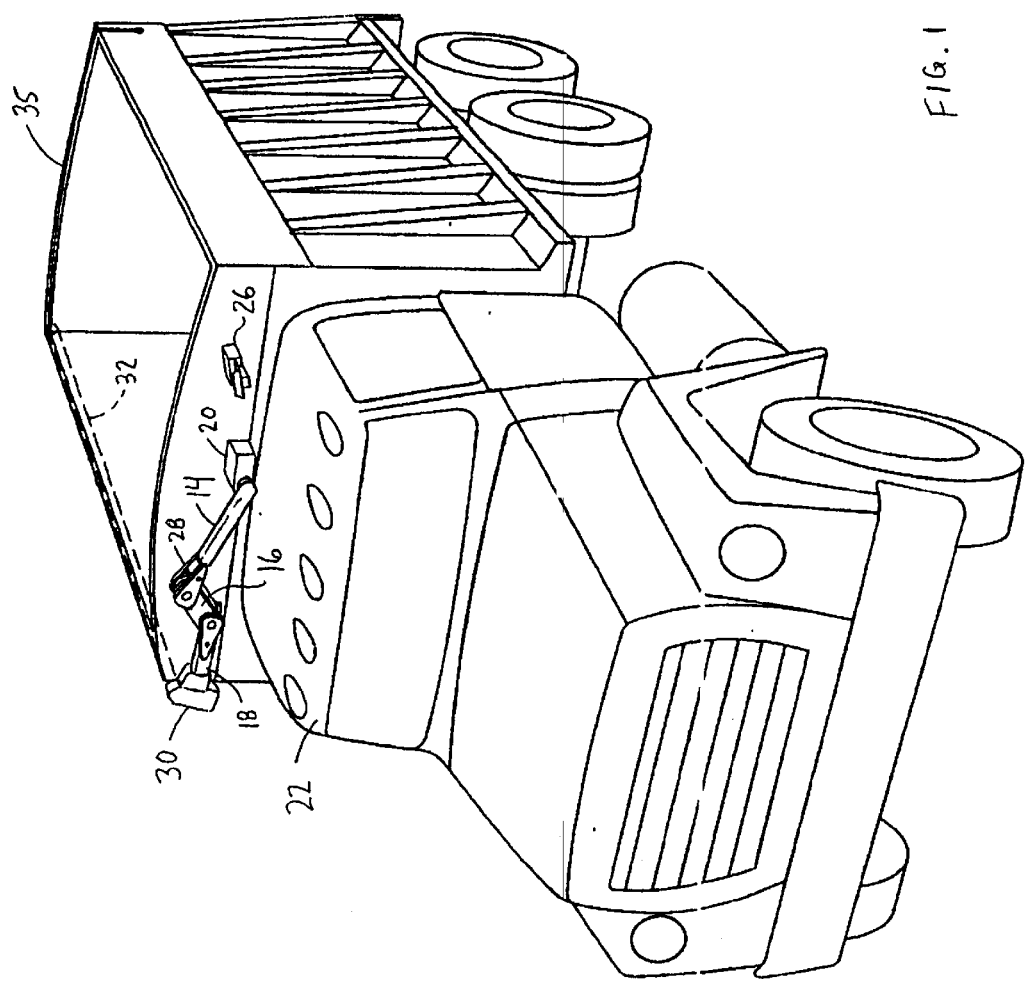
FIG. 1 is a perspective view of a truck including an apparatus according to the present invention for covering a bed of the truck.
Figure 2:
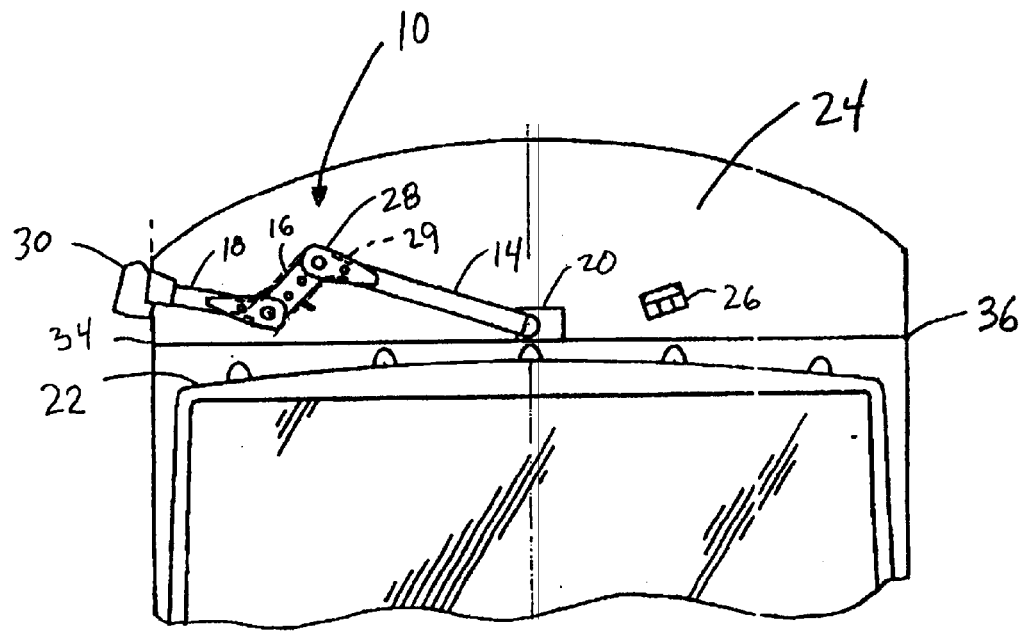
FIG. 2 is a front view of the truck shown in FIG. 1.

With reference to the drawings, the preferred embodiments of the present invention will be described. FIGS. 1 and 2 show an arm assembly 10 according to the present invention for a flexible tarp or cover 12 of a truck. The arm assembly 10 comprises a base 14, an intermediate segment 16 and an extension 18. The base 14 is mounted to the truck at a base plate 20 proximate a top of a cab 22 of the truck. While the base plate 20 is shown in the drawings above the top of the cab 22, it should be appreciated that the base plate may also mounted below the top of the cab 22 in the space between the cab and the trailer.

The base plate 20 includes at least one spiral torsion spring. Preferably, one end of each of the springs engages a groove formed in the surface of and extending a substantial portion of the length of a center shaft, while the other ends of the springs cooperate with a locator pin. Further details of this arrangement are taught by U.S. Pat. No. 5,887,937, which is hereby incorporated by reference. In this way, the base 14 is normally biased clockwise as shown across at least a portion of a front 24 of the truck bed through intermediate positions shown in FIG. 3 and FIG. 4. A stop 26 is welded or otherwise attached to the front 24 of the truck bed, and limits the pivotal movement of the base 14.

The intermediate segment 16 is pivotally connected at one of its ends to the base 14 by a hinge or knuckle 28. Preferably, a knuckle shaft is welded or otherwise fixed to one of a pair of plates extending from an upper end of the base 14. The knuckle shaft extends through the lower end of the intermediate segment 16 such that the knuckle shaft is rotatable with respect to the intermediate segment. One end of each of a plurality of spiral torsion springs preferably engages an axial groove formed in the knuckle shaft. The other ends of the springs cooperate with a knuckle locator pin. Further details of this arrangement are taught by U.S. Pat. No. 5,944,374, which is hereby incorporated by reference.

The extension 18 is similarly connected at one of its ends to the intermediate segment 16. In this way, the intermediate segment 16 and the extension 18 are normally biased clockwise as shown. Rotation of the intermediate segment 16 in both directions may be limited by one or more stops which are preferably in the form of plates 29. The plates 29 are welded or otherwise attached to the knuckle 28, and extend inwardly therefrom to engage the intermediate segment and prevent overrotation. The knuckle between the intermediate segment 16 and the extension 18 may be provided with similar stops to limit rotation of the extension, if necessary.

A motor 30 is mounted on the distal end of the extension 18. A rotatable reel 32 extends from the motor 30, and is operatively connected to one end of the cover 12 so as to function as a take-up spool. The other end of the cover 12 is clamped, riveted, or otherwise fixed at one or more points along a line below the top of one side 34 of the truck. In the fully uncovered position shown in FIGS. 1 and 2, the cover 12 is wound on the reel 32. In this position, the truck bed may dump rearwardly or in either the clockwise or counterclockwise direction without interference from the retracted cover. An elastic cord 35 is also preferably provided proximate the rear of the truck for biasing the reel toward the right side of the truck.

Figure 3:
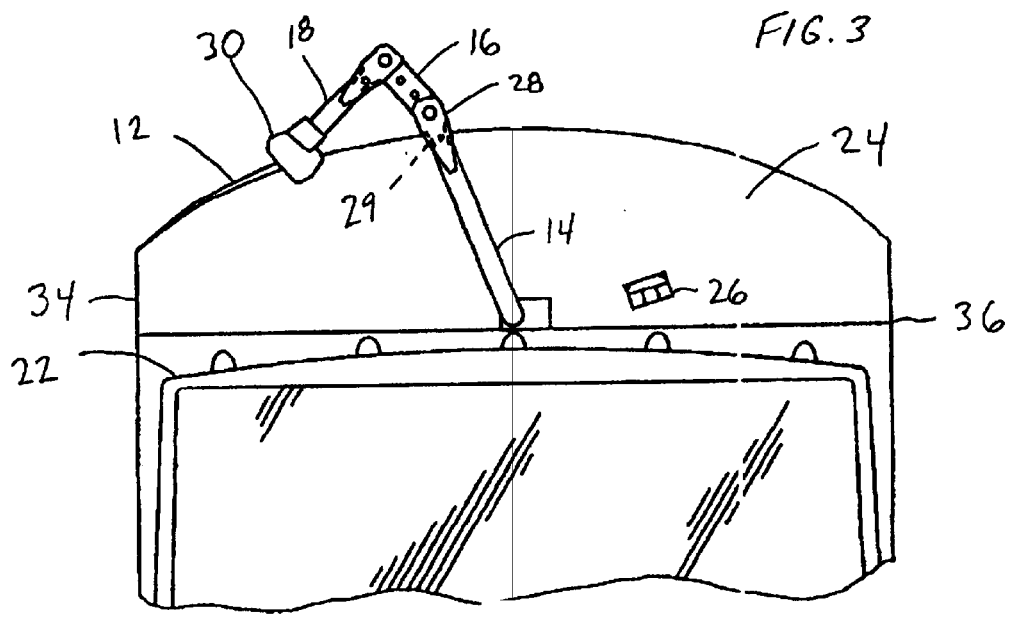
FIG. 3 is a front view of the truck showing a cover in a partially deployed position.
Figure 4:
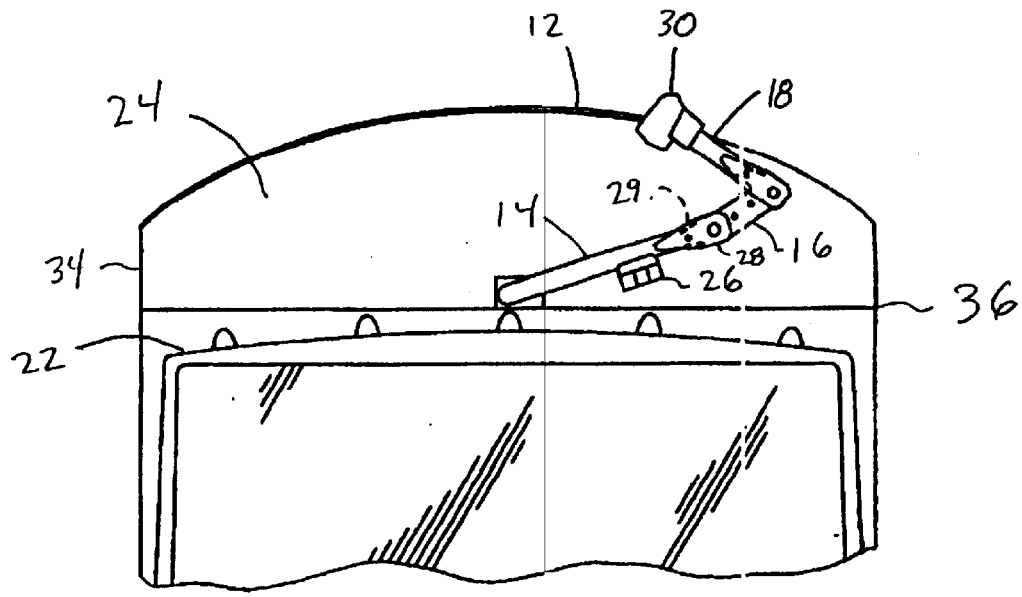
FIG. 4 is a front view of the truck showing the cover in a more fully deployed position.
Figure 5:
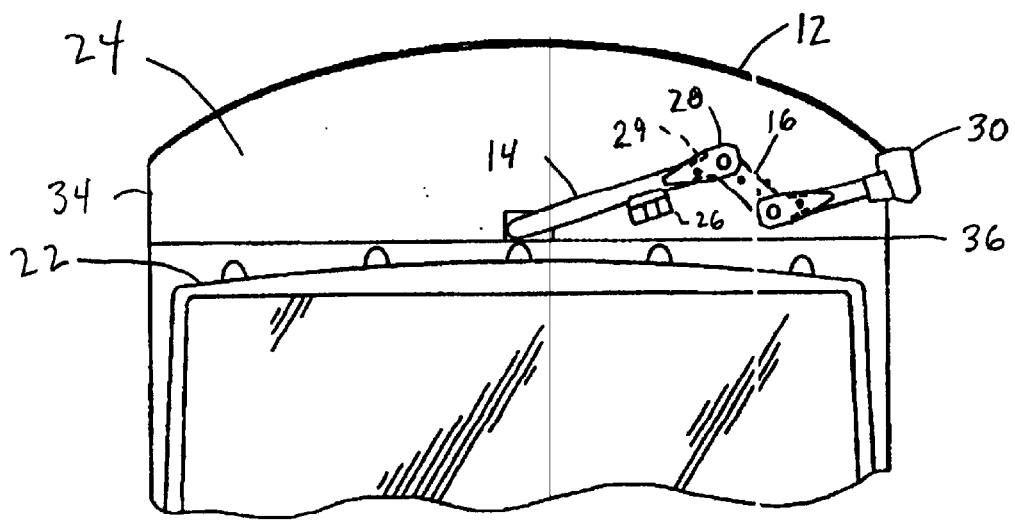
FIG. 5 is a front view of the truck showing the cover in a deployed position.

The motor 30 is preferably provided with a brake which allows, among other things, for the apparatus to remain in the uncovered position shown in FIGS. 1 and 2. When the brake is released, the base 14 swings toward the right side 36 of the truck bed until it engages the stop 26, as shown in FIGS. 3, 4 and 5. As the base 14 is biased toward the right side 36 of the truck, the knuckle springs also bias the intermediate segment 16 and the extension 18 toward the right side of the truck so as to hold the cover 12 in tension. The motor 30 may be powered, from within or without the cab of the truck, to facilitate this operation. Further details of one embodiment of the motor are taught by U.S. Pat. No. 5,829,819, which is hereby incorporated by reference.

In this way, the cover 12 is pulled off of the reel 32 and extended over the load bed. One or more hooks may be provided to establish a positive stop to engage the reel 32 and prevent overextension, or additional stops can be provided for the various sections of the arm assembly. In this event, the motor 30 can be reversed to drive the reel 32 and retract the cover 12 against the tension force of the springs to uncover the load bed. As an alternative to the hooks, the reel 32 can be tucked below a lip on the top of the right side 36 of the truck, when such a lip is available.

Any rotation of the base 14 less than about 250 degrees is contemplated, and in a preferred embodiment the base sweeps out an arc of about 120 degrees. Rotation of the intermediate segment 16 relative to the base 14 is normally in the range of about 185 degrees. Any rotation of the extension 18 relative to the intermediate segment 16 is also contemplated, and in a preferred embodiment the extension rotates a total of about 250 degrees. By varying the position of the locator pins, the preload of the springs, the number of springs and/or the spring constant of the springs, the forces biasing the base, the intermediate segment, and the extension toward the deployed position are variable. In a preferred embodiment, six springs are used to bias the base 14, two springs are used between the base and the intermediate segment 16, and one or two springs are used in the knuckle between the intermediate segment and the extension 18. In this arrangement the knuckle between the extension 18 and the intermediate segment 16 opens quickly, thus accommodating the weight of the motor 30 and allowing the motor to swing from either its fully covered or uncovered place and clear the respective top edge of the side of the truck.

It should be understood that while the forms of the invention shown and described above constitute preferred embodiments of the invention, they are not intended to illustrate all possible forms thereof. It should also be understood that the words used are words of description rather than limitation, and various changes may be made without departing from the spirit and scope of the invention disclosed.

What is claimed is:

1. An apparatus for extending and retracting a cover over a bed of a truck, the apparatus comprising:

a base pivotably connected to the truck proximate a top of the cab;

an intermediate segment pivotably connected to the base;

an extension pivotably connected to the intermediate segment;

a reel connected to the extension; and a motor mounted on the extension and drivingly engaged with the reel to selectively extend and retract the cover over the truck bed.

2. The apparatus of claim 1 further comprising a first stop fixed to a front of the bed of the truck.

3. The apparatus of claim 2 wherein the base engages the first stop to prevent further pivoting of the base.

4. The apparatus of claim 1 further comprising a second stop extending from the base.

5. The apparatus of claim 4 wherein the second stop limits rotation of the intermediate segment.

6. The apparatus of claim 1 wherein the base is biased toward a retracted position.

7. An apparatus for extending and retracting a cover over a bed of a truck, the apparatus comprising:

a stop fixed to a front of the bed of the truck;

a base connected to the truck proximate a top of the cab and pivotable across the front of the bed of the truck until the base contacts the stop;

an intermediate segment pivotably connected to the base;

an extension pivotably connected to the intermediate segment;

a reel connected to the extension; and a motor mounted on the extension and drivingly engaged with the reel to selectively extend and retract the cover over the truck bed.

8. The apparatus of claim 7 further comprising a plate extending from the base.

9. The apparatus of claim 8 wherein the plate limits rotation of the intermediate segment.

10. The apparatus of claim 7 wherein the base is biased toward a retracted position.

* * * * *